US010762235B2

(12) United States Patent
Stecher

(10) Patent No.: US 10,762,235 B2
(45) Date of Patent: Sep. 1, 2020

(54) METHODS, SYSTEMS, AND MEDIA FOR STORING AND RETRIEVING DATA FROM DISTRIBUTED VAULTS

(71) Applicant: McAfee, LLC, Santa Clara, CA (US)

(72) Inventor: Martin Stecher, Paderborn (DE)

(73) Assignee: McAfee, LLC, Santa Clara, CA (US)

( * ) Notice: Subject to any disclaimer, the term of this patent is extended or adjusted under 35 U.S.C. 154(b) by 135 days.

(21) Appl. No.: 16/047,433

(22) Filed: Jul. 27, 2018

(65) Prior Publication Data
US 2019/0377899 A1 Dec. 12, 2019

Related U.S. Application Data

(60) Provisional application No. 62/683,887, filed on Jun. 12, 2018.

(51) Int. Cl.
G06F 21/00 (2013.01)
G06F 21/62 (2013.01)
H04L 29/06 (2006.01)
H04L 9/06 (2006.01)
G06F 21/60 (2013.01)

(52) U.S. Cl.
CPC .......... G06F 21/6245 (2013.01); G06F 21/60 (2013.01); G06F 21/62 (2013.01); H04L 9/0643 (2013.01); H04L 63/083 (2013.01); H04L 63/104 (2013.01); H04L 63/123 (2013.01); H04L 2209/38 (2013.01)

(58) Field of Classification Search
CPC ...... G06F 21/60; G06F 21/602; G06F 21/604; G06F 21/62; H04L 9/08; H04L 9/0819; H04L 9/085; H04L 9/0861; H04L 9/0877; H04L 9/088; H04L 9/0894; H04L 9/0897
See application file for complete search history.

(56) References Cited

U.S. PATENT DOCUMENTS 9,037,904 B2     5/2015  Volvovski et al.
9,841,899 B2    12/2017  Leggette et al.
2015/0262171 A1* 9/2015  Langschaedel ........ G06Q 20/40
                                                                705/71

(Continued)

OTHER PUBLICATIONS

International Search Report and Written Opinion dated Jun. 24, 2019 in International Patent Application No. PCT/2019/024598.

(Continued)

Primary Examiner — Edward Zee
(74) Attorney, Agent, or Firm — Byrne Poh LLP

(57) ABSTRACT

Methods, systems, and media for storing and retrieving data from distributed vaults are provided. In some embodiments, a method for storing and retrieving data from distributed vaults is provided, the method comprising: generating, by a first user device, a plurality of pieces of a data item, wherein a count N of the plurality of pieces equals a count of vault devices in a group of vault devices, wherein the data item can be reconstructed from a subset of the plurality of pieces, and wherein the data item corresponds to a key to access secure content; for each piece of the data item, transmitting the piece of the data item to a unique vault device; requesting, by a second user device, the subset of the plurality of pieces; generating the data item using the subset of the plurality of pieces; and using the data item to access the secure content.

24 Claims, 5 Drawing Sheets

(56) References Cited

U.S. PATENT DOCUMENTS

2017/0103083 A1  4/2017  von Thienen
2018/0095696 A1  4/2018  Resch et al.
2018/0101914 A1  4/2018  Samuel et al.

OTHER PUBLICATIONS

Asmuth, C. and Bloom, J., "A Modular Approach to Key Safeguarding", In IEEE Transactions on Information Theory, vol. IT-29, No. 2, Mar. 1983, pp. 208-210.
Karnin, E.D. et al., "On Secret Sharing Systems", In IEEE Transactions on Information, vol. IT-29, No. 1, Jan. 1983, pp. 35-41.
Wikipedia, "Secret Sharing", pp. 1-8, Feb. 20, 2020, availible at: https://en.wikipedia.org/wiki/Secret_sharing.
Wikipedia, "Shamir's Secret Sharing", pp. 1-7, Feb. 20, 2020, availible at: https://en.wikipedia.org/wiki/Shamir%27s_Secret_Sharing.
Wikipedia, "Lagrange polynomial", pp. 1-7, Feb. 20, 2020, availible at: https://en.wikipedia.org/wiki/Lagrange_polynomial.

* cited by examiner

METHODS, SYSTEMS, AND MEDIA FOR STORING AND RETRIEVING DATA FROM DISTRIBUTED VAULTS

CROSS REFERENCE TO RELATED APPLICATION

This application claims the benefit of U.S. Provisional Patent Application No. 62/683,887, filed Jun. 12, 2018, which is hereby incorporated by reference herein in its entirety.

TECHNICAL FIELD

The disclosed subject matter relates to methods, systems, and media for storing and retrieving data from distributed vaults.

BACKGROUND

People frequently have passwords or keys to various accounts or to a device (e.g., email accounts, to a phone, etc.). In some cases, an owner of a password or key may want an emergency data holder to be able to gain access to the password or key in case of an emergency, such as the owner becoming incapacitated. However, it can be difficult for the owner of the password or key to trust an emergency data holder. For example, it can be difficult for the owner of the password or key to trust that the emergency data holder will only act in an emergency or to determine that the emergency data holder has not used the password or key without telling the owner. Additionally, storing the password or key with the emergency data holder can be risky, because the emergency data holder may be hacked, may lose the password or key, etc.

Accordingly, it is desirable to provide new methods, systems, and media for storing and retrieving data from distributed vaults.

SUMMARY

Methods, systems, and media for storing and retrieving data from distributed vaults are provided. In accordance with some embodiments of the disclosed subject matter, a method for storing and retrieving data from distributed vaults is provided, the method comprising: generating, by a first user device associated with a first user, a plurality of pieces of a data item, wherein a count N of the plurality of pieces equals a count of vault devices in a group of vault devices, wherein the data item can be reconstructed from a subset of the plurality of pieces having a count M that is less than N, and wherein the data item corresponds to a key to access secure content; for each piece of the data item of the plurality of pieces, transmitting the piece of the data item to a unique, different vault device in the group of vault devices; recording a transfer of ownership of the data item from the first user to a second user; requesting, by a second user device associated with the second user, the subset of the plurality of pieces of the data item from a corresponding subset of the group of vault devices; generating, by the second user device, the data item using the subset of the plurality of pieces of the data item; and using the data item to access the secure content by the second user device.

In accordance with some embodiments of the disclosed subject matter, a system for storing and retrieving data from distributed vaults is provided, the system comprising: a first user device, comprising: a first memory; and a first hardware processor coupled to the first memory, wherein the first hardware processor is configured to: generate, by the first user device associated with a first user, a plurality of pieces of a data item, wherein a count N of the plurality of pieces equals a count of vault devices in a group of vault devices, wherein the data item can be reconstructed from a subset of the plurality of pieces having a count M that is less than N, and wherein the data item corresponds to a key to access secure content; for each piece of the data item of the plurality of pieces, transmit the piece of the data item to a unique, different vault device in the group of vault devices; record a transfer of ownership of the data item from the first user to a second user; and a second user device, comprising: a second memory; and a second hardware processor coupled to the second memory, wherein the second hardware processor is configured to: request, by the second user device associated with the second user, the subset of the plurality of pieces of the data item from a corresponding subset of the group of vault devices; generate, by the second user device, the data item using the subset of the plurality of pieces of the data item; and use the data item to access the secure content by the second user device.

In accordance with some embodiments of the disclosed subject matter, a non-transitory computer-readable medium containing computer-executable instructions that, when executed by a processor, cause the processor to perform a method for storing and retrieving data from distributed vaults, the method comprising: generating, by a first user device associated with a first user, a plurality of pieces of a data item, wherein a count N of the plurality of pieces equals a count of vault devices in a group of vault devices, wherein the data item can be reconstructed from a subset of the plurality of pieces having a count M that is less than N, and wherein the data item corresponds to a key to access secure content; for each piece of the data item of the plurality of pieces, transmitting the piece of the data item to a unique, different vault device in the group of vault devices; recording a transfer of ownership of the data item from the first user to a second user; requesting, by a second user device associated with the second user, the subset of the plurality of pieces of the data item from a corresponding subset of the group of vault devices; generating, by the second user device, the data item using the subset of the plurality of pieces of the data item; and using the data item to access the secure content by the second user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
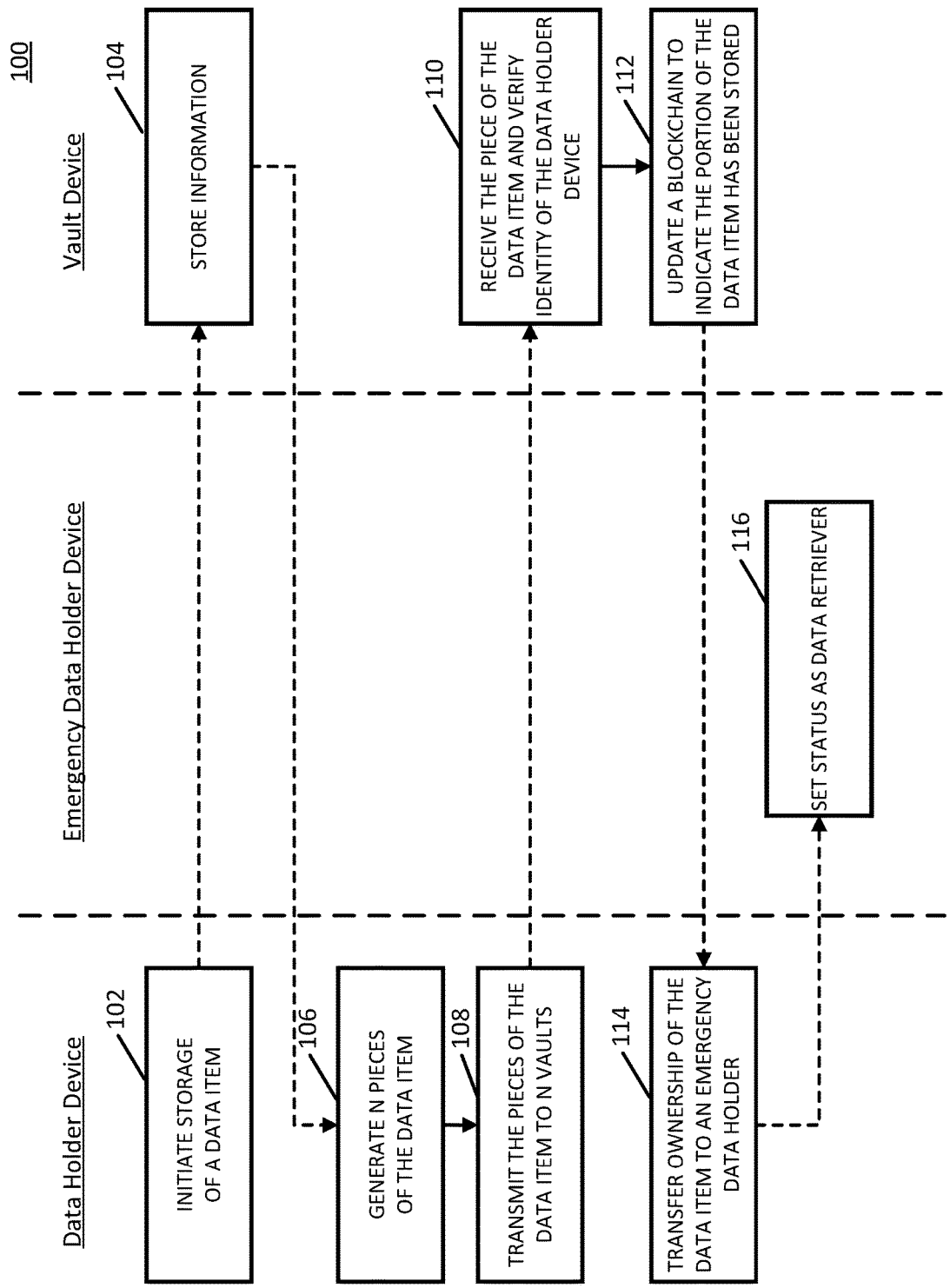
FIG. 1 shows an example of an information flow diagram for storing a data item in a distributed vault system in accordance with some embodiments of the disclosed subject matter.

In accordance with various embodiments, mechanisms (which can include methods, systems, and media) for storing and retrieving data from distributed vaults are provided.

In some embodiments, the mechanisms described herein can be used by a data owner to store a data item. For example, in some embodiments, a data item can be a password or key belonging to the data owner (e.g., a password to an account, a password to a device, and/or any other suitable type of password or key). In some embodiments, the mechanisms can allow a data owner to generate any suitable number of pieces of a data item (e.g., three, four, five, and/or any other suitable number), and store each piece of the data item in a different vault that is participating in a distributed vault system, as shown in and described below in connection with FIG. 1. In some embodiments, the mechanisms can use any suitable technique(s) to generate N pieces of a data item that are to be stored in N vaults, such that the data item can be fully reconstructed using only M pieces of the data item, where M<N. For example, in some embodiments, in an instance where N=3 (that is, N pieces of the data item are generated and stored in three vaults), a data item can be reconstructed using M=2 data pieces. More detailed techniques for generating N pieces of a data item and reconstructing the data item using M of the N data pieces are described below in connection with FIGS. 3 and 4.

In some embodiments, a data owner can transfer ownership of a data item to an emergency data holder, thereby giving the emergency data holder authorization to retrieve pieces of the data item stored in vaults of a distributed vault system. In some embodiments, a emergency data holder can request that a vault participating in a distributed vault system release a piece of a data item stored by the vault, and the vault can verify that the emergency data holder is authorized to retrieve the piece of the data item. In some embodiments, the emergency data holder can request M of N data pieces from M of N vaults and can reconstruct a data item, as described below in connection with FIGS. 2 and 4. Note that, in some embodiments, the emergency data holder can have a private key that is necessary to retrieve a piece of data from a vault.

In some embodiments, interactions with a data item or access of a data item can be recorded in a log, which can be accessed by any suitable entity, such as a data owner, an emergency data holder, a vault participating in a distributed vault system for storage of the data item, and/or any other suitable entity. Note that, in some embodiments, a log can be a distributed log or a distributed ledger, such as a blockchain. For example, as described below in connection with FIGS. 1 and 2, a blockchain can indicate a global status of storage of a data item using vaults in a distributed vault system. As a more particular example, in some embodiments, a blockchain can indicate that each vault participating in the distributed vault system has stored a piece of a data item, that pieces of a data item are owned by a data owner and/or an emergency data holder, that pieces of a data item have been retrieved by an emergency data holder, and/or any other suitable information. Note that, in some embodiments, a status associated with storage of a data item can be updated, for example, to indicate that pieces of a data item have been successfully stored, that ownership of a data item has changed, that a data owner has retrieved pieces of a data item, etc., thereby allowing a trail or log associated with storage and access of the data item to be maintained for transparency. As another example, in some embodiments, entries in a blockchain can be used as evidence that an emergency data holder has not used a key to retrieve pieces of a data item from vaults in a distributed vault system. As a more particular example, in some embodiments, an original data owner can request a status of a data item stored in a distributed vault to determine whether an emergency data holder has retrieved pieces of the data item from the distributed vault system. As another more particular example, in some embodiments, entries in a blockchain can be used by an emergency data holder to prove that the emergency data holder has not retrieved pieces of a data item. As yet another example, in some embodiments, a blockchain can be used to ensure that no entity can impersonate an emergency data holder. As a more particular example, in some embodiments, a blockchain can identify a single entity that is an owner of a data item at a point in time, or a single entity with authorization to retrieve pieces of a data item, and vaults participating in a distributed vault system can verify that a request for pieces of the data item stored in the vaults is from the single entity authorized to retrieve the pieces of the data item using the identification in the blockchain. Note that, in some embodiments, a blockchain can additionally or alternatively be used to facilitate payment of any fees associated with storage of a data item using a distributed vault system, such as fees from a data owner, fees from individual vaults of the distributed vault system, and/or any other suitable fees.

Note that, in some embodiments, the techniques described herein can be used by any suitable data owner and emergency data holder entities. For example, in some embodiments, a data owner can be an employee at a company or organization, and an emergency data holder can be an employer of the employee. As another example, in some embodiments, an emergency data holder can be any suitable government or law enforcement organization, and ownership of a data item (e.g., a password or key to an account or device associated with an individual) can be transferred to the government or law enforcement organization for use if needed. Additionally, note that, in some embodiments, vaults participating in a distributed vault system can be any suitable entities. For example, in some embodiments, each vault can be associated with a business or other organization. As a more particular example, in some embodiments, the businesses or organizations associated with vaults of the distributed vault system can be competitors, thereby protecting against multiple vaults in the distributed vault system conspire with each other to retrieve pieces of a data item and reconstruct a stored data item.

The mechanisms described herein can be used to improve security of computer systems. For example, in some embodiments, the mechanisms can be used to securely store a password or a key. More particularly, by storing a password or a key in multiple pieces, each of which is stored in a unique and different vault device, the mechanisms described herein can prevent illicit retrieval of a stored password or key (e.g., by a hacker). For example, if a password or a key were stored in only one vault device, a hacker could retrieve the password or the key by hacking the one vault device. However, as described herein, by storing a password or a key as multiple pieces (e.g., three, four, five, and/or any other suitable number) each stored in a different and unique vault device, a hacker would have to hack multiple vault devices to retrieve the pieces of the password or the key. Furthermore, by generating pieces of a password or a key that can be reconstructed using only a subset of the pieces, the password or the key can be reconstructed even if some vault devices storing pieces of the password or the key are offline or unavailable. Additionally, by recording indications of storage of each piece of a password or a key and each attempted retrieval of a piece of a password or a key, for example, in a blockchain, the mechanisms described herein can provide transparency in an instance where pieces of a password or a key are retrieved by an entity designated as an emergency data holder, thereby ensuring that a designated emergency data holder does not inappropriately retrieve and reconstruct a stored password or a key.

Turning to FIG. 1, an example 100 of an information flow diagram for storing data using a distributed vault is shown in accordance with some embodiments of the disclosed subject matter. As illustrated, blocks of process 100 can be executed by a data holder device, an emergency data holder device, and one or more vault servers.

At 102, a data holder device can initiate storage of a data item. In some embodiments, a data holder device can be controlled by any suitable entity, such as an individual, a business, an organization, a government (e.g., a local government, a state government, a national government, and/or any other suitable government), an employee of an organization, and/or any other suitable type of entity. In some embodiments, a data item can be any suitable type of data or content. For example, in some embodiments, a data item can be a password or key used to access a user account, a password or key to access electronic communications (e.g., emails or other messages), a password or key to access an electronic medical record, a password or key to access legal documents (e.g., a will, a contract, and/or any other suitable type of legal document), and/or any other suitable type of content. As another example, in some embodiments, a data item can be a decryption key associated with an encrypted data store which can hold any suitable data (e.g., confidential data, and/or any other suitable type of data or information). Note that, in some embodiments, the data item can be required to satisfy any suitable criteria, such as having a particular minimum length (e.g., more than a predetermined number of characters), having more than a predetermined entropy or strength, being encrypted using any particular protocols, and/or any other suitable criteria. Additionally, note that in some embodiments, a data item can be any other suitable information, such as an important document, and/or any other suitable type of information. In some embodiments, a data item suitable for storage in a distributed vault system can be required to be below a predetermined size (e.g., less than a predetermined number of bytes, and/or any other suitable size).

In some embodiments, the data holder device can initiate storage of the data item in any suitable manner. For example, in some embodiments, the data holder device can transmit a message to a vault of a group of vaults forming a distributed vault system to initiate storage of the data item. Additionally or alternatively, in some embodiments, the data holder device can pay any required fees associated with storage of the data item using the distributed vault system. For example, in some embodiments, the data holder device can transmit any suitable type of currency to the vault of the group of vaults.

Note that, in some embodiments, any suitable type of blockchain can be used to facilitate storage of a data item, changes in a status of storage of a data item, facilitate any required payments associated with storage of a data item, record interactions with a data item, record changes in ownership of a data item, record access of a data item, and/or any other suitable information associated with storage of a data item in a distributed vault system as described herein. For example, in some embodiments, a payment of a fee paid by the data holder device required for storage of the data item as described above can be processed through the blockchain. More detailed examples of use of the blockchain to record events associated with storage of the data item or retrieval of the data item are described below in connection with FIGS. 1-4. Note that, in some embodiments, a blockchain can be either a public blockchain or a private blockchain. In some embodiments, in an instance where a blockchain is a public blockchain, each vault participating in the distributed vault system can run a node on the blockchain or use other nodes associated with the blockchain to execute transactions and access status information, and information associated with status of a data item stored in the distributed vault system can be accessed by users using a public tracking system. Additionally, in some embodiments, in instances where the blockchain is a public blockchain, a currency associated with the public blockchain can be used for any fees associated with storage of the data item. Alternatively, in an instance where a blockchain is a private blockchain, payment of any fees associated with storage of the data item can be processed without using the blockchain.

At 104, the vault can store any suitable information associated with the data holder device and/or storage of a data item by the data holder device. For example, in some embodiments, the information can include an identifier of the data holder device (e.g., a public address corresponding to a private key associated with the data holder device, and/or any other suitable identifier), addresses of other vaults in the group of vaults forming the distributed vault system to be used to store the data item, and/or any other suitable information. In some embodiments, a status of vaults in the group of vaults can additionally be stored. For example, at 104, prior to storage of any pieces of the data item, a status of "idle" can be stored in connection with vaults in the group of vaults, indicating that no pieces of the data item have yet been stored by any of the vaults in the group of vaults. Note that, in some embodiments, the vault can transmit any stored information to a blockchain associated with storage of the data item. Additionally, in some embodiments, the vault can transmit any suitable payment required for storage of the data item to other vaults in the group of vaults forming the distributed vault system.

At 106, the data holder device can generate N pieces of the data item, where N is a number of nodes or vaults in the distributed vault system. In some embodiments, N can be any suitable number (e.g., three, four, five, and/or any other suitable number). In some embodiments, the data holder device can generate the N pieces of the data item using any suitable technique or combination of techniques. For example, in some embodiments, the data holder device can generate the N pieces of the data item such that the data item can be reconstructed using data from only M pieces of the data item, where M is smaller than N. As a more particular example, in some embodiments, the data holder device can split the data item into N−1 pieces of the data item and can generate an Nth piece of the data item based on the N−1 pieces of the data item. Note that, in some such embodiments, M can be equal to N−1. More detailed techniques for generating the N pieces of the data item are described below in connection with FIG. 3.

At 108, the data holder device can transmit each generated piece of the data item to a unique one of the individual vault devices in the group of vault devices forming the distributed vault system. For example, in an instance where N=5 (that is, there are five vaults in the group of vaults forming the distributed vault system), five pieces of the data item can be generated at 106, and each piece can be transmitted to a different vault of the five vault devices.

Note that, in some embodiments, the data holder device can transmit each generated piece of the data item to a corresponding individual vault device by including the piece of the data item in a message transmitted to the individual vault device. In some embodiments, the data holder device can sign the message that includes the generated piece of the data item with a private key associated with the data holder device.

At 110, each vault device in the group of vaults to which a piece of the data item was sent can receive its piece of the data and verify that the data holder device that sent that piece of the data item is controlled by the data owner of the data item. In some embodiments, the vault device can verify that the data holder device that sent the piece of the data item is controlled by the owner of the data item in any suitable manner. For example, in some embodiments, the vault device can compare an identifier associated with the data holder device with an identifier of the data owner. As another example, in in instances where the piece of the data item is included in a message transmitted by the data holder device, each vault can verify a signature of the message. In some embodiments in response to verifying that the sender of the received message that includes a piece of the data item is the data holder device, the vault device can store the piece of the data item. For example, in some embodiments, a vault device can be a server (e.g., as shown in and described below in connection with FIG. 5), and the piece of the data item can be stored in memory of the server.

At 112, each vault device in the group of vaults can update a log associated with a blockchain used to store indications of steps associated with storage of the data item to indicate that the piece of the data item received by the vault device has been stored. For example, in some embodiments, each vault device can transmit a message to the blockchain that indicates that a status associated with the vault device is to be changed to indicate that the piece of the data item has been stored.

At 114, the data holder device can record a transfer of ownership of the data item from the data owner to an emergency data holder. Note that, in some embodiments, the emergency data holder can be any suitable entity, such as an individual, an employer that employs the data holder, a law enforcement organization, a business, a government, and/or any other suitable entity.

In some embodiments, the data holder device can record the transfer of ownership of the data item using any suitable information and any suitable technique(s). For example, in some embodiments, the data holder device can have previously received a public key and/or a public address associated with the emergency data holder device. In some such embodiments, the data holder device can record a transfer of ownership of the data item using the public key and/or the public address. For example, in some embodiments, the data holder device can transmit a message to a blockchain indicating that a field associated with the data owner stored in the blockchain is to be set to the public address of the emergency data holder device. Note that, in some embodiments, a data item can be associated with only one data owner, and a current data owner can then transfer ownership of the data item to a different entity. For example, in an instance where the data holder device is associated with a first data owner, and where the user associated with the data holder device transfers ownership of the data item to the emergency data holder, the emergency data holder can become the data owner of the data item. Continuing with this example, in some embodiments, the emergency data holder device can transfer ownership to a third device, and a user associated with the third device can then become the data owner of the data item. Note that, in some embodiments, the techniques described herein as implemented by an emergency data holder device can be implemented by any current data owner of a data item. Alternatively, note that, in some embodiments, a data item can have multiple owners at one time.

At 116, the emergency data holder device can set a status associated with the data item indicating that the emergency data holder device is authorized to be a data retriever of pieces of the data item stored in the vaults. In some embodiments, the emergency data holder device can set the status indicating that the emergency data holder device is authorized to be the data retriever in any suitable manner. For example, in some embodiments, the emergency data holder device can transmit a message to a blockchain that indicates that a DataRetriever field associated with the data item is to be set to be an identifier associated with the emergency data holder device (e.g., a public address associated with the emergency data holder device, and/or any other suitable identifier). In some such embodiments, the message to the blockchain can be signed by the emergency data holder device using a private key associated with the emergency data holder device.

Figure 2:
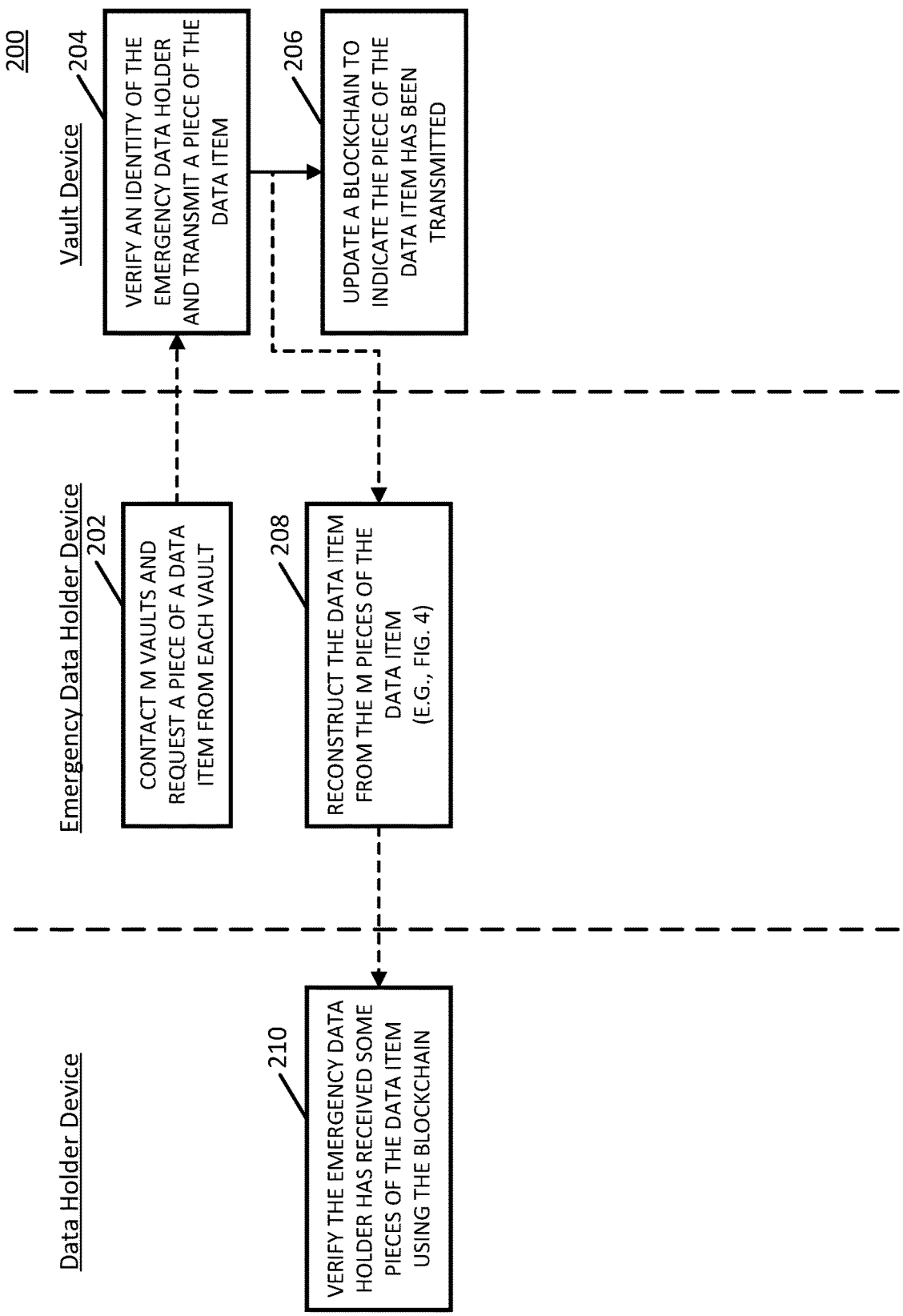
FIG. 2 shows an example of an information flow diagram for retrieving pieces of a data item from vaults in a distributed vault system and reconstructing a data item in accordance with some embodiments of the disclosed subject matter.

Turning to FIG. 2, an example 200 of an information flow diagram for retrieving a data item from a distributed vault system is shown in accordance with some embodiments of the disclosed subject matter. As illustrated, in some embodiments, blocks of process 200 can be executed by a data holder device, an emergency data holder device, and one or more vault servers. Note that, in some embodiments, the emergency data holder device can be a device that has been set as a data retriever for a particular data item, as described above in connection with 116 of FIG. 1.

At 202, an emergency data holder device can contact vault devices that have each stored a piece of a data item that is to be retrieved and reconstructed by the emergency data holder device. In some embodiments, the emergency data holder device can contact any suitable number of vaults participating in a distributed vault system. For example, in an instance where the distributed vault system includes N nodes or vaults, the emergency data holder device can determine a minimum number of vaults required to reconstruct the data item (M), and can contact M of the N vaults. As a more particular example, in an instance where N=3, M can be 2. As another more particular example, in an instance where N=4, M can be 3. As yet another more particular example, in an instance where N=5, M can be 3. Note that, in some embodiments, M can be any suitable number such that M>=0.5N and M<=0.75N. In some embodiments, the emergency data holder device can select the M vaults from the N candidate vaults in any suitable manner. For example, in some embodiments, the emergency data holder device can select the first M vaults in a list of N vaults. Note that, in some embodiments, in an instance where a particular vault of the selected M vaults is unavailable (e.g., because the particular vault is currently offline or is unavailable for any other suitable reason), the emergency data holder device can select another vault from the remaining N−M vaults.

Note that, in some embodiments, the techniques described herein can be used by a data holder device to retrieve a data item that was previously stored by the data holder device, rather than retrieved by an emergency data holder device. For example, in some embodiments, a data holder device can store a password or key associated with protected content using the techniques described above in connection with FIG. 1, and can use the techniques described herein in connection with FIG. 2 to retrieve the password or key. In some such embodiments, blocks described herein in connection with FIG. 2 as performed by the emergency data holder device can be performed by the data holder device.

In some embodiments, the emergency data holder device can request a piece of the data item to be reconstructed from each of the M vaults in any suitable manner. For example, in some embodiments, the emergency data holder device can transmit a message to each of the M vaults requesting the piece of the data item stored by the vault device. In some embodiments, the message can be signed using a private key associated with the emergency data holder device. Note that, in some embodiments, a message transmitted by the emergency data holder device to each vault device can include an address of the vault device, and, in some embodiments, the message that includes the address of the vault device can be signed using the private key associated with the emergency data holder device, thereby preventing a vault of the M vaults from using the received message with any of the other vaults to retrieve the pieces of the data item stored by the other vaults.

At 204, each vault device of the M selected vaults can verify an identify of the emergency data holder device and can transmit a piece of the data item stored by the vault device to the emergency data holder device. For example, in some embodiments, each vault device can compare an entity listed as a data retriever in information associated with storage of the data item (e.g., as described above in connection with 116 of FIG. 1) with the sender of the message to determine if the emergency data holder device is authorized to retrieve a piece of the data item stored by the vault device. In some embodiments, in response to verifying an identity of the emergency data holder device as authorized to retrieve the piece of the data item stored by the vault device, each vault device can transmit the piece of the data item to the emergency data holder device.

Note that, in some embodiments, a piece of the data item requested from a particular vault device can be transmitted to the emergency data holder device after any suitable delay period. In some embodiments, the request to retrieve the piece of the data item can be recorded in the blockchain, thereby giving the data owner time to revoke data retrieval privileges from the emergency data holder device within the delay period prior to the piece of the data item being transmitted from the vault device to the emergency data holder device. In some embodiments, the data owner can revoke data retrieval privileges from the emergency data holder device using any suitable technique. For example, in some embodiments, the data holder device can be associated with a private deletion key, and can transmit messages to each vault device in the distributed vault system that is signed using the private deletion key. In some such embodiments, each vault device can receive a message from the data holder device that is signed using the private deletion key associated with the data holder device and, in response to receiving the message, can delete the piece of the data item stored by the vault device and/or determine that the piece of the data item stored by the vault device is not to be transmitted to the emergency data holder device.

Additionally, note that, in some embodiments, each piece of the data item stored in each vault in the group of vaults can be associated with a time-to-live value that indicates a time period after which the pieces of the data item will be destroyed if the pieces of the data item are not retrieved or otherwise touched during the time period.

At 206, each vault device of the M selected vaults that has transmitted a piece of the data item to the emergency data holder device can update the blockchain indicating that the piece of the data item has been transmitted to the emergency data holder device. For example, in some embodiments, each vault device can update a current status of the vault device to indicate that the piece of the data item stored by the vault device has been retrieved. Note that, in some embodiments, an entry in the blockchain indicating that the piece of the data item has been retrieved by the emergency data holder device can be encrypted for any suitable time period, and can later be decrypted (e.g., after the time period has elapsed). In some embodiments, such encryption of the data retrieval entry in the blockchain can be used by, for example, a law enforcement entity to prevent a suspect who was a former data owner (e.g., prior to transfer of ownership from a data holder device to an emergency data holder device, as described above in connection with 114 of FIG. 1) from knowing that the piece of the data item has been retrieved. In some embodiments, any other suitable techniques can be used to prevent a former data owner from knowing that pieces of a data item have been retrieved by an emergency data holder.

At 208, the emergency data holder device can reconstruct the data item using the pieces of the data item retrieved from each of the M vaults. In some embodiments, the emergency data holder device can use any suitable technique or combination of techniques to reconstruct the data item, as shown in and described below in more detail in connection with FIG. 4.

At 210, the data holder device (e.g., a former data owner prior to transfer of ownership of the data item from the data holder device to the emergency data holder device, as described above in connection with 114 of FIG. 1) can verify that the emergency data holder device has retrieved pieces of the data item. In some embodiments, the data holder device can verify that the emergency data holder device has retrieved pieces of the data item, for example, to verify that the emergency data holder device has successfully retrieved a sufficient number of pieces of the data item to reconstruct the data item, and/or for any other suitable purpose. For example, in some embodiments, the data holder device can access a status of each of the N vault devices participating in the distributed vault system (e.g., a status indicated in the blockchain) to determine if the piece of the data item stored by each vault device has been successfully retrieved by the emergency data holder device. Note that, in some embodiments, the blockchain can directly notify the data holder device that data has been retrieved from any of the vaults. Additionally or alternatively, in some embodiments, each vault device of the M vault devices can transmit a notification to the data holder device indicating that a piece of the data item stored by the vault device has been retrieved by the emergency data holder device. Note that, in some embodiments, the data holder device may not verify that the emergency data holder device has retrieved pieces of the data item, and 210 can be omitted.

Figure 3:
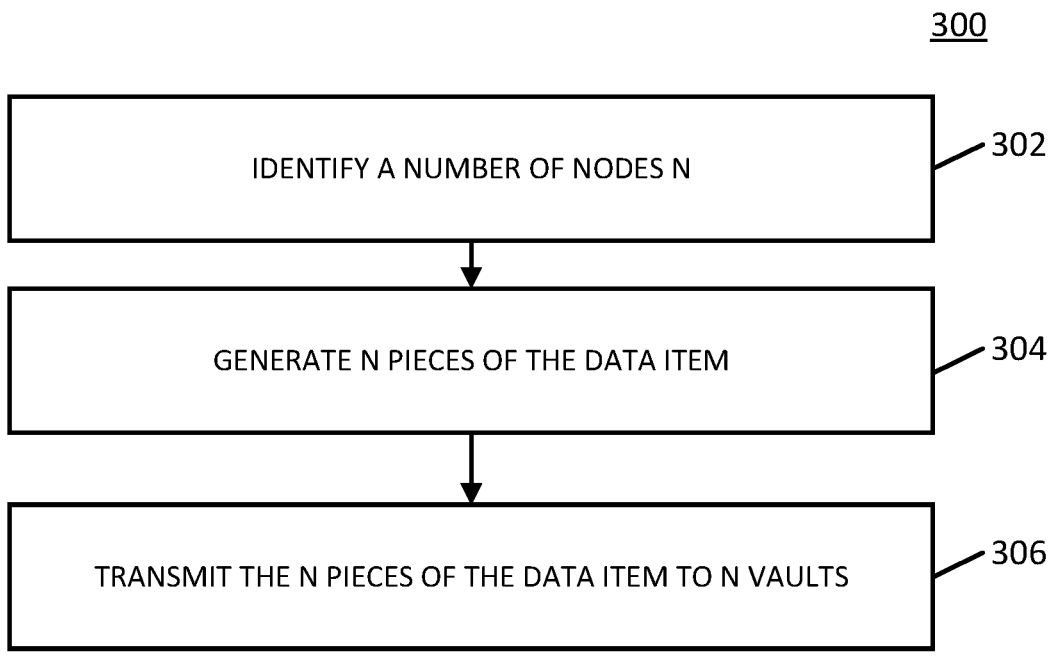
FIG. 3 shows an example of a process for storing a data item in a distributed vault system in accordance with some embodiments of the disclosed subject matter.

Turning to FIG. 3, an example 300 of a process for generating pieces of a data item that are each to be stored in a different vault device of a distributed vault system is shown in accordance with some embodiments of the disclosed subject matter. In some embodiments, blocks of process 300 can be executed by a device associated with a data holder, as shown in and described above in connection with FIGS. 1 and 2.

Process 300 can begin at 302 by identifying a number of nodes or vaults N in a distributed vault system. In some embodiments, N can be any suitable number, such as 3 vaults, 4 vaults, 5 vaults, and/or any other suitable number.

At 304, process 300 can generate N pieces of the data item. In some embodiments, process 300 can generate the N pieces of the data item using any suitable technique or combination of techniques. For example, in an instance where N=3, process 300 can convert the data item into a binary bitstream, and can generate the three pieces based on each bit in the bitstream. As a more particular example, in some embodiments, a first piece of the three pieces can correspond to odd bits of the bitstream, a second piece of the three pieces can correspond to even bits of the bitstream, and a third piece of the three pieces can correspond to an XOR of the odd bits and the even bits of the bitstream. As a specific example, in an instance where a binary bitstream is 100101, the first piece of the three pieces can be 100, the second piece of the three pieces can be 011, and the third piece of the three pieces can be the XOR of 100 and 011, or 111. In some embodiments, the binary bitstream can be fully reconstructed using only two of the three pieces, as described below in more detail in connection with 406 of FIG. 4.

As another example, in an instance where N=4, process 300 can convert the data item into a ternary bitstream that uses bit values of 0, 1, or 2 by converting the data item to the data item in base 3. Process 300 can generate the four pieces of the data item similarly to as described above in connection with a binary bitstream. For example, in an instance where the ternary bitstream is 222010022, a first piece of the four pieces can be the first bit, the fourth bit, etc. (that is, 200), the second piece of the four pieces can be the second bit, the fifth bit, etc. (that is, 212), the third piece of the four pieces can be the third bit, the sixth bit, etc. (that is, 202), and the fourth piece of the four pieces can be parity numbers. In some embodiments, the parity numbers for the fourth piece of the four pieces can be defined by a sum of bits for each of the first three pieces modulo 3. As a specific example, in an instance where the first piece of the data item is 200, the second piece of the data item is 212, and the third piece of the data item is 202, the fourth piece of the data item can have three bits that are, respectively: (2+2+2)mod 3; (0+1+0)mod 3; and (0+2+2)mod 3, or 011. In some embodiments, the ternary bitstream can be fully reconstructed using only three of the four pieces of the data item, as described below in more detail in connection with 406 of FIG. 4.

As yet another example, in an instance where N=5, in some embodiments, process 300 can generate five pieces of the data item using an algorithm described below. Process 300 can divide the data item into 4-bit nibbles. For a particular 4-bit nibble X, process 300 can calculate $X_1$ and $X_2$ such that $X=X_1X_2$, with $X_1$ and $X_2$ each having two bits. Process 300 can select a $Y_1$ and $Y_2$ such that $Y_i \neq X_i$ and such that $\overline{Y}_i \neq X_i$, where $\overline{Y}_i$ is the bit complement of $Y_i$. That is, in an instance where $X_i=00$ or 11, $Y_i$ can be 01 or 10. Process 300 can then, for each 4-bit nibble X, create five corresponding pieces of the data item A, B, C, D, and E, each corresponding to a vault that is to store the piece of the data item. In some embodiments, $A=X_1X_2$; $B=X_1Y_2$; $C=X_1\overline{Y}_2$; $D=Y_1X_2$; and $E=\overline{Y}_1X_2$. In some such embodiments, any combination of three of A, B, C, D, and E can be used to recreate the data item, as described below in connection with 406 of FIG. 4. In some embodiments, process 300 can shuffle assignments of A, B, C, D, and E after each 4-bit nibble, thereby randomizing what is stored by each vault.

Note that, in some embodiments, any other suitable techniques or combinations of techniques can be used to generate the N pieces of the data item. For example, in some embodiments, any suitable algorithm such as the LaGrange Interpolating Polynomial Scheme, Vector Scheme by George Blakeley, the Asmuth-Bloom method, the Karnin-Greene-Hellman method, and/or any other suitable algorithm for implementing an (m, n)-threshold scheme of secret sharing can be used, as described, for example in *Applied Cryptography* by Bruce Schneier, which is hereby incorporated by reference in its entirety.

At 306, process 300 can transmit each of the N pieces of the data item to a unique one of the N vaults participating in the distributed vault system. Continuing with the example described above where N=3, process 300 can transmit the first piece of the data item corresponding to the odd bits of the binary bitstream to a first vault, a second piece of the data item corresponding to the even bits of the binary bitstream to a second vault, and a third piece of the data item corresponding to an XOR of the odd bits and the even bits to a third vault. As another example, continuing with the example described above where N=5, process 300 can transmit nibbles corresponding to A to a first vault, nibbles corresponding to B to a second vault, nibbles corresponding to C to a third vault, nibbles corresponding to D to a fourth vault, and nibbles corresponding to E to a fifth vault.

In some embodiments, process 300 can transmit the pieces of the data item in any suitable manner. For example, as described above in connection with 112 of FIG. 1, process 300 can transmit a message to each vault device that includes a corresponding piece of the data item, and the message can be signed using a private key associated with the data holder device. Note that, as described above in connection with 108, in some embodiments, the message can include any other suitable information.

Note that, in some embodiments, the vaults can correspond to any suitable entities. For example, in some embodiments, each vault device can be associated with a business such that the businesses are competitors. As another example, in some embodiments, each vault device can be associated with a different government (e.g., a different national government, a different state government, and/or any other suitable different government).

Figure 4:
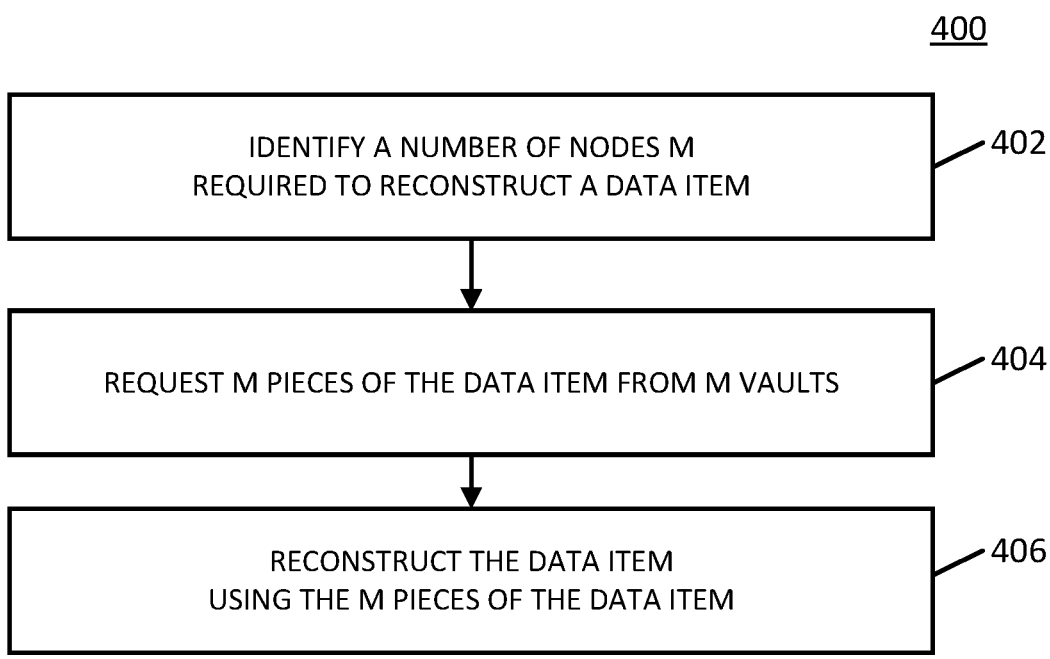
FIG. 4 shows an example of a process for retrieving pieces of a data item from vaults in a distributed vault system and reconstructing a data item in accordance with some embodiments of the disclosed subject matter.

Turning to FIG. 4, an example 400 of a process for reconstructing a data item using pieces of the data item each stored by a different vault in a distributed vault system is shown in accordance with some embodiments of the disclosed subject matter. In some embodiments, blocks of process 400 can be executed by a device associated with an emergency data holder device that has been authorized to retrieve pieces of a data item stored by a data holder device, as described above in connection with FIGS. 1 and 2.

Process 400 can begin by identifying a number of nodes or vaults M required to reconstruct a data item at 402. In some embodiments, process 400 can identify the number of nodes or vaults required to reconstruct the data item M based on a number of nodes or vaults N participating in a distributed vault system. For example, as described above, in an instance where N=3, M can be 2. As another example, in an instance where N=4, M can be 3. As yet another example, in an instance where N=5, M can be 3. As still another example, in some embodiments, process 400 can determine an M such that M>=0.5N and M<=0.75N. In some embodiments, M can be determined using any suitable technique. For example, in some embodiments, an indication of an algorithm used to reconstruct the data item can be stored on an emergency data holder device (that is, for example, transmitted to the emergency data holder device from a data holder device, and/or given to the emergency data holder device in any other suitable manner) along with an M corresponding to the algorithm.

In some embodiments, process 400 can select M vaults out of a group of N vaults participating in the distributed vault system. For example, in some embodiments, process 400 can select the first M vaults in a list of N vaults. Note that, in an instance where a selected vault from the M selected vaults is unavailable (e.g., because the vault is offline, and/or unavailable for any other suitable reason), process 400 can select another vault from the remaining N-M vaults.

At 404, process 400 can request pieces of the data item from each of the selected M vaults. For example, as described above in connection with 202 of FIG. 2, process 400 can transmit a message to each vault of the selected M vaults requesting a piece of the data item stored by the vault. As described above, in some embodiments, the message can include any suitable information, an address of the vault, and/or any other suitable information. In some embodiments, the message can be signed using a private key associated with the emergency data holder device.

In some embodiments, process 400 can receive M pieces of the data item from the M vaults in response to the request to each of the selected M vaults.

At 406, in response to receiving M pieces of the data item from the M vaults, process 400 can reconstruct the data item. In some embodiments, process 400 can use an algorithm or a technique to reconstruct the data item from the retrieved pieces of the data item based on the number of nodes or vaults N in the distributed vault system and the number of pieces of data M and the algorithm or the technique. For example, in an instance where N=3 and M=2, continuing with the example given above in connection with 304 of FIG. 3, process 400 can retrieve two pieces of the data item corresponding to two of: the odd bits of a bitstream corresponding to the data item and the even bits of the bitstream corresponding to the data item; the odd bits of the bitstream corresponding to the data item and the XOR of the odd bits and the even bits of the bitstream corresponding to the data item; or the even bits of the bitstream corresponding to the data item and the XOR of the odd bits and the even bits of the bitstream corresponding to the data item. Process 400 can then reconstruct the full data item based on the two retrieved pieces of the data item. For example, in an instance where the two retrieved pieces correspond to the odd bits and the even bits of the bitstream, process 400 can reconstruct the full binary bitstream corresponding to the data item using the odd bits and the even bits. As another example, in an instance where the two retrieved pieces correspond to either the odd bits or the even bits and the XOR of the odd bits and the even bits, process 400 can determine the other half of the bitstream by calculating an XOR of the two retrieved pieces.

As yet another example, in an instance where N=4 and M=3, continuing with the example given above in connection with 304 of FIG. 3, process 400 can retrieve three of the four pieces of the data item corresponding to three of: bits 1, 4, etc. of a ternary bitstream; bits 2, 5, etc. of the ternary bitstream; bits 3, 6, etc. of the ternary bitstream; and bit(1+2+3)mod 3, bit (4+5+6)mod 3, etc. Process 400 can then reconstruct a full ternary bitstream corresponding to the full data item using the three retrieved pieces. For example, in an instance where the three retrieved pieces correspond to: bits 1, 4, etc.; bits 2, 5, etc.; and bits 3, 6, etc., process 400 can reconstruct the full ternary bitstream using the retrieved pieces. As another example, in an instance where the retrieved pieces include the parity bits of the ternary bitstream, or bits(1+2+3)mod 3, etc., process 400 can calculate the full ternary bitstream bit by bit. As a more particular example, in an instance where the retrieved pieces include bits 1, 4, etc. (e.g., "200"), bits 2, 5, etc. (e.g., "212"), and parity bits (e.g., "011"), process 400 can calculate bit 3 of the full ternary bitstream as (parity bit 1–bit 1–bit 2)mod 3, or (0–2–2)mod 3=2. Process 400 can repeat this process to calculate the other two bits to fully reconstruct the ternary bitstream. Note that the result of this process will result in bits 3, 6, etc. of the ternary bitstream, that is, "202." Additionally, note that process 400 can use the same technique if the parity bits are retrieved along with any two of the three pieces of the ternary bitstream.

As still another example, in an instance where N=5 and M=3, continuing with the example given above in connection with 304 of FIG. 3, process 400 can retrieve three pieces of the data item corresponding to three of A, B, C, D, and E, as described above in more detail in connection with 304. As described above, in some embodiments, $A=X_1X_2$; $B=X_1Y_2$; $C=X_1\overline{Y}_2$; $D=Y_1X_2$; and $E=\overline{Y}_1X_2$. Note that there are ten possible combinations of three pieces of the data item selected from A, B, C, D, and E. In some embodiments, process 400 can reconstruct the data item based on the three retrieved pieces using the technique described herein below. In some embodiments, process 400 can retrieve three pieces of the data item, such as [A, B, and C], [A, B, and D], [B, D, and E], and/or any other possible combination of three of A, B, C, D, and E. For example, in an instance where A, B, and C are retrieved, process 400 can receive the three pieces of the data item $X_1X_2$, $X_1Y_2$, and $X_1\overline{Y}_2$. In some embodiments, for each of A, B, C, D, or E in the retrieved pieces of the data item, process 400 can process the first half and the second half of each piece separately. For example, continuing with the example given above where A, B, and C are retrieved, process 400 can consider $X_1$, $X_1$, and $X_1$ (that is, the first half of each of A, B, and C) and can separately consider $X_2$, $Y_2$, and $\overline{Y}_2$ (that is, the second half of each of A, B, and C). Process 400 can determine whether any group of two bits (e.g., an $X_i$, $Y_i$, or $\overline{Y}_i$) in the first half of each of A, B, and C occurs more than two times. For example, in the example given above, $X_1$ occurs three times. Process 400 can then determine that a first group of two bits of the reconstructed data item is $X_1$. Alternatively, if process 400 determines that each group of two bits in the first half of the three retrieved pieces is different (for example, if B, D, and E had been retrieved), process 400 can determine that two of the groups of two bits correspond to $Y_1$ and $\overline{Y}_1$, and that the third group of two bits corresponds to $X_1$. Continuing with the second half of each of the retrieved pieces of the data item, that is, $X_2$, $Y_2$, and $\overline{Y}_2$ if A, B, and C are retrieved, process 400 can determine whether any group of two bits in the second half occurs more than two times. In the example given above where A, B, and C are retrieved, process 400 can determine that each group of two bits is different. Therefore, process 400 can determine that two of the groups of two bits correspond to $Y_2$ and $\overline{Y}_2$, and that the third group of two bits corresponds to $X_2$.

Note that, in some embodiments, process 400 can repeat this procedure for all nibbles of the data item.

Figure 5:
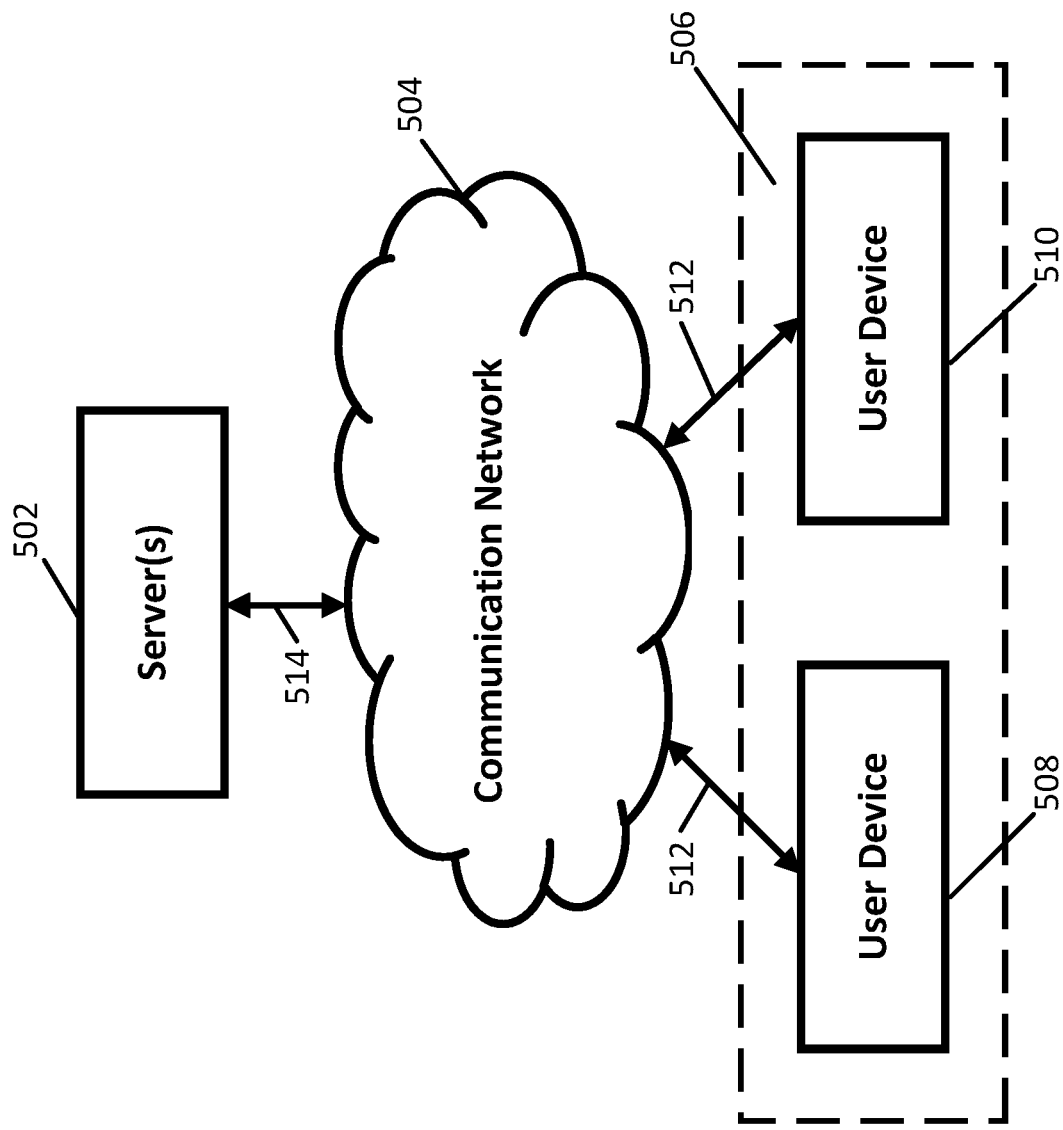
FIG. 5 shows a schematic diagram of an illustrative system suitable for implementation of mechanisms described herein for using a distributed vault system to store and retrieve data in accordance with some embodiments of the disclosed subject matter.

Turning to FIG. 5, an example 500 of hardware for storing and retrieving data from distributed vaults that can be used in accordance with some embodiments of the disclosed subject matter is shown. As illustrated, hardware 500 can include one or more servers 502, a communication network 504, and/or one or more user devices 506, such as user devices 508 and 510.

Server(s) 502 can be any suitable server(s) for storing information, data, and/or programs, and/or any other suitable type of content. For example, in some embodiments, each of server(s) 502 can be associated with a vault that stores a piece of a data item, as described above in connection with FIGS. 1-4. As another example, in some embodiments, a server 502 can store a blockchain that indicates storage and/or access of a data item or pieces of a data item, as described above in connection with FIGS. 1-4. Note that, in some embodiments, server(s) 502 can include any suitable number (e.g., one, two, five, ten, and/or any other suitable number) of servers.

Communication network 504 can be any suitable combination of one or more wired and/or wireless networks in some embodiments. For example, communication network 504 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 506 can be connected by one or more communications links (e.g., communications links 512) to communication network 504 that can be linked via one or more communications links (e.g., communications links 514) to server 502. The communications links can be any communications links suitable for communicating data among user devices 506 and server 502 such as network links, dial-up links, wireless links, hard-wired links, any other suitable communications links, or any suitable combination of such links.

User devices 506 can include any one or more user devices suitable for generating pieces of a data item, transmitting pieces of a data item to vaults included in a distributed vault, requesting data from a server, and/or performing any other suitable function(s). In some embodiments, a user device 506 can be a data holder device or an emergency data holder device, as described above in connection with FIGS. 1-4. In some embodiments, user devices 506 can include any suitable types of user devices. For example, in some embodiments, user devices 506 can include a mobile phone, a tablet computer, a desktop computer, and/or any other suitable type of user device.

Although server(s) 502 is illustrated as one device, the functions performed by server 502 can be performed using any suitable number of devices in some embodiments. For example, in some embodiments, multiple devices can be used to implement the functions performed by server 502.

Although two user devices 508 and 510 are shown in FIG. 5 to avoid over-complicating the figure, any suitable number of user devices, and/or any suitable types of user devices, can be used in some embodiments.

Figure 6:
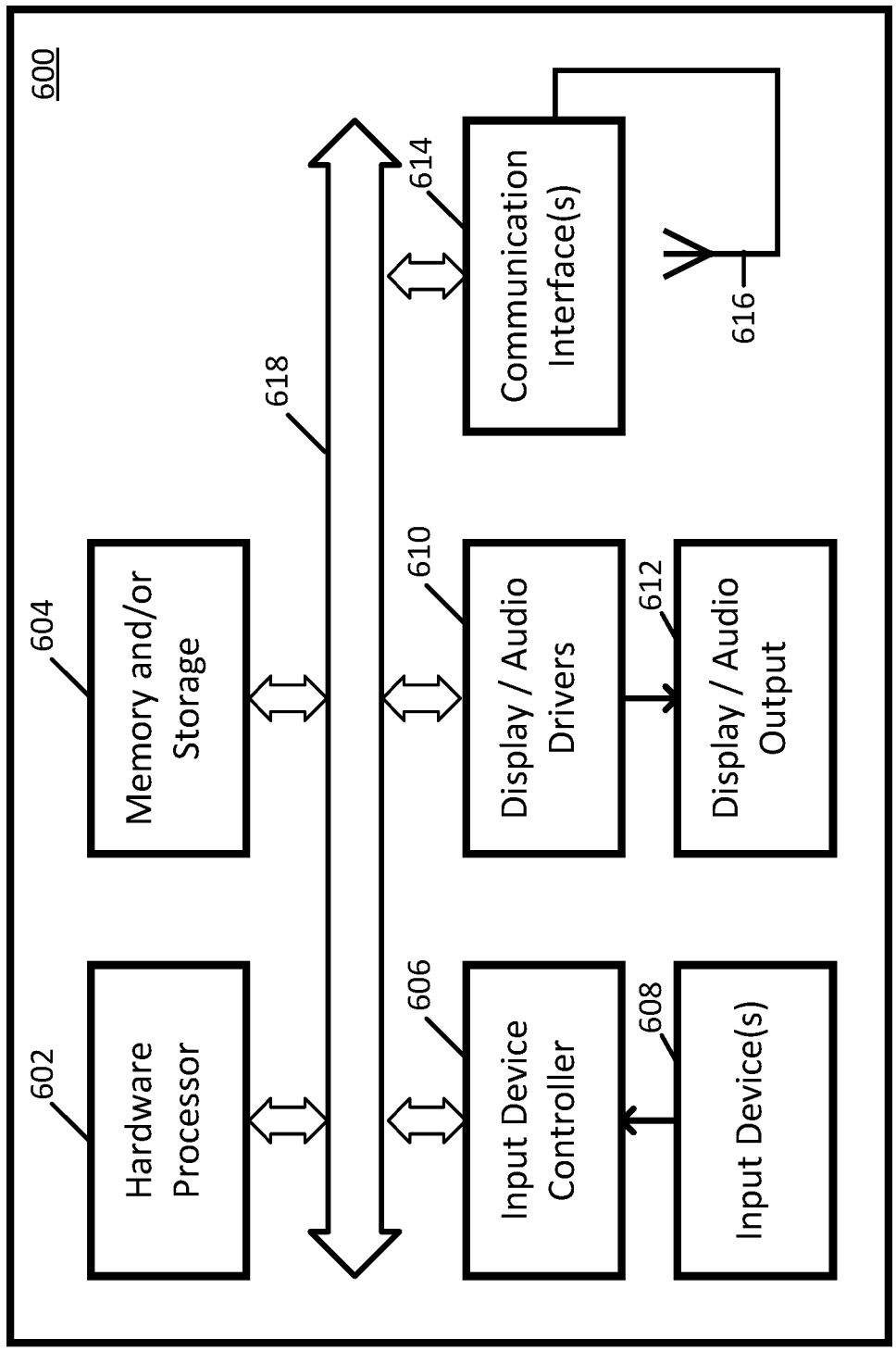
FIG. 6 shows a detailed example of hardware that can be used in a server and/or a user device of FIG. 5 in accordance with some embodiments of the disclosed subject matter.

Server(s) 502 and user devices 506 can be implemented using any suitable hardware in some embodiments. For example, in some embodiments, devices 502 and 506 can be implemented using any suitable general purpose computer or special purpose computer. For example, a mobile phone may be implemented using a special purpose computer. Any such general purpose computer or special purpose computer can include any suitable hardware. For example, as illustrated in example hardware 600 of FIG. 6, such hardware can include hardware processor 602, memory and/or storage 604, an input device controller 606, an input device 608, display/audio drivers 610, display and audio output circuitry 612, communication interface(s) 614, an antenna 616, and a bus 618.

Hardware processor 602 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 602 can be controlled by a server program stored in memory and/or storage of a server, such as server 502. For example, in some embodiments, the server program can cause hardware processor 602 to store a piece of a data item in memory 604 of server 502, transmit a piece of a data item to a user device in response to a request, modify a blockchain, and/or perform any other suitable functions. In some embodiments, hardware processor 602 can be controlled by a computer program stored in memory and/or storage 604 of user device 506 that corresponds to a data holder device, as described above in connection with FIGS. 1-4. For example, the computer program can cause hardware processor 602 to generate pieces of a data item, transmit pieces of a data item to different servers, change ownership of a data item, and/or perform any other suitable functions. In some embodiments, hardware processor 602 can be controlled by a computer program stored in memory and/or storage 604 of user device 506 that corresponds to an emergency data holder device, as descried above in connection with FIGS. 1-4. For example, the computer program can cause hardware processor 602 to request pieces of a data item from vaults participating in a distributed vault system, reconstruct the data item from the pieces of the data item, and/or perform any other suitable functions.

Memory and/or storage 604 can be any suitable memory and/or storage for storing programs, data, and/or any other suitable information in some embodiments. For example, memory and/or storage 604 can include random access memory, read-only memory, flash memory, hard disk storage, optical media, and/or any other suitable memory.

Input device controller 606 can be any suitable circuitry for controlling and receiving input from one or more input devices 608 in some embodiments. For example, input device controller 606 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 610 can be any suitable circuitry for controlling and driving output to one or more display/audio output devices 612 in some embodiments. For example, display/audio drivers 610 can be circuitry for driving a touchscreen, a flat-panel display, a cathode ray tube display, a projector, a speaker or speakers, and/or any other suitable display and/or presentation devices.

Communication interface(s) 614 can be any suitable circuitry for interfacing with one or more communication networks (e.g., computer network 504). For example, interface(s) 614 can include network interface card circuitry, wireless communication circuitry, and/or any other suitable type of communication network circuitry.

Antenna 616 can be any suitable one or more antennas for wirelessly communicating with a communication network (e.g., communication network 504) in some embodiments. In some embodiments, antenna 616 can be omitted.

Bus 618 can be any suitable mechanism for communicating between two or more components 602, 604, 606, 610, and 614 in some embodiments.

Any other suitable components can be included in hardware 600 in accordance with some embodiments.

In some embodiments, at least some of the above described blocks of the processes of FIGS. 1-4 can be executed or performed in any order or sequence not limited to the order and sequence shown in and described in connection with the figures. Also, some of the above blocks of FIGS. 1-4 can be executed or performed substantially simultaneously where appropriate or in parallel to reduce latency and processing times. Additionally or alternatively, some of the above described blocks of the processes of FIGS. 1-4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for storing and retrieving data from distributed vaults are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for storing and retrieving data from distributed vaults, comprising:
generating, by a first user device associated with a first user, a plurality of pieces of a data item, wherein the plurality of pieces has a count N that equals a count of vault devices in a group of vault devices, wherein the data item can be reconstructed from a subset of the plurality of pieces having a count M that is less than N, and wherein the data item corresponds to a key to access secure content;
for each piece of the data item of the plurality of pieces, transmitting the piece of the data item to a unique, different vault device in the group of vault devices;
recording a transfer of ownership of the data item from the first user to a second user;
requesting, by a second user device associated with the second user, the subset of the plurality of pieces of the data item from a corresponding subset of the group of vault devices;
generating, by the second user device, the data item using the subset of the plurality of pieces of the data item; and
using the generated data item to access the secure content by the second user device.

2. The method of claim 1, wherein indications that each piece of the plurality of pieces of the data item has been stored by the vault devices in the group of vault devices are stored in a blockchain.

3. The method of claim 2, wherein the blockchain is updated in response to the second user device retrieving the subset of the plurality of pieces of the data item.

4. The method of claim 3, further comprising receiving, by the first user device, an indication that the second user device has retrieved the subset of the plurality of pieces of the data item from the corresponding subset of the group of vault devices.

5. The method of claim 1, wherein generating the plurality of pieces of the data item comprises converting the data item into a bitstream comprised of a plurality of bits, wherein each bit in the plurality of bits is assigned to one piece of the plurality of pieces of the data item based on a position of the bit in the plurality of bits.

6. The method of claim 5, wherein converting the data item into the bitstream comprises converting the data item into the bitstream using a predetermined numerical base, and wherein the count N of the plurality of pieces is one more than the predetermined numerical base, and wherein the predetermined numerical base is greater than two.

7. The method of claim 6, wherein a first piece of the plurality of pieces of the data item corresponds to an indication of a parity of remaining pieces of the plurality of pieces of the data item.

8. The method of claim 1, wherein generating the plurality of pieces of the data item comprises:
dividing the data item into a series of 4-bit nibbles; and
for a first 4-bit nibble of the series of 4-bit nibbles, assigning each piece of the plurality of pieces of the data item a 4-bit nibble value that includes at least two of: a first two bits of the first 4-bit nibble, a second two bits of the first 4-bit nibble, a bit complement of the first two bits of the first 4-bit nibble, and a bit complement of the second two bits of the first 4-bit nibble, wherein each piece of the plurality of pieces of the data item is assigned a different 4-bit nibble value.

9. A system for storing and retrieving data from distributed vaults, the system comprising:
a first user device, comprising:
a first memory; and
a first hardware processor coupled to the first memory, wherein the first hardware processor is configured to:
generate, by the first user device associated with a first user, a plurality of pieces of a data item, wherein the plurality of pieces has a count N that equals a count of vault devices in a group of vault devices, wherein the data item can be reconstructed from a subset of the plurality of pieces having a count M that is less than N, and wherein the data item corresponds to a key to access secure content;
for each piece of the data item of the plurality of pieces, transmit the piece of the data item to a unique, different vault device in the group of vault devices;
record a transfer of ownership of the data item from the first user to a second user; and
a second user device, comprising:
a second memory; and
a second hardware processor coupled to the second memory, wherein the second hardware processor is configured to:
request, by the second user device associated with the second user, the subset of the plurality of pieces of the data item from a corresponding subset of the group of vault devices;
generate, by the second user device, the data item using the subset of the plurality of pieces of the data item; and
use the generated data item to access the secure content by the second user device.

10. The system of claim 9, wherein indications that each piece of the plurality of pieces of the data item has been stored by the vault devices in the group of vault devices are stored in a blockchain.

11. The system of claim 10, wherein the blockchain is updated in response to the second user device retrieving the subset of the plurality of pieces of the data item.

12. The system of claim 11, wherein the first hardware processor is further configured to receive, by the first user device, an indication that the second user device has retrieved the subset of the plurality of pieces of the data item from the corresponding subset of the group of vault devices.

13. The system of claim 9, wherein generating the plurality of pieces of the data item comprises converting the data item into a bitstream comprised of a plurality of bits, wherein each bit in the plurality of bits is assigned to one piece of the plurality of pieces of the data item based on a position of the bit in the plurality of bits.

14. The system of claim 13, wherein converting the data item into the bitstream comprises converting the data item into the bitstream using a predetermined numerical base, and wherein the count N of the plurality of pieces is one more than the predetermined numerical base, and wherein the predetermined numerical base is greater than two.

15. The system of claim 14, wherein a first piece of the plurality of pieces of the data item corresponds to an indication of a parity of remaining pieces of the plurality of pieces of the data item.

16. The system of claim 9, wherein generating the plurality of pieces of the data item comprises:
dividing the data item into a series of 4-bit nibbles; and
for a first 4-bit nibble of the series of 4-bit nibbles, assigning each piece of the plurality of pieces of the data item a 4-bit nibble value that includes at least two of: a first two bits of the first 4-bit nibble, a second two bits of the first 4-bit nibble, a bit complement of the first two bits of the first 4-bit nibble, and a bit complement of the second two bits of the first 4-bit nibble, wherein each piece of the plurality of pieces of the data item is assigned a different 4-bit nibble value.

17. A non-transitory computer-readable medium containing computer-executable instructions that, when executed by a processor, cause the processor to perform a method for storing and retrieving data from distributed vaults, the method comprising:
generating, by a first user device associated with a first user, a plurality of pieces of a data item, wherein the plurality of pieces has a count N that equals a count of vault devices in a group of vault devices, wherein the data item can be reconstructed from a subset of the plurality of pieces having a count M that is less than N, and wherein the data item corresponds to a key to access secure content;
for each piece of the data item of the plurality of pieces, transmitting the piece of the data item to a unique, different vault device in the group of vault devices;
recording a transfer of ownership of the data item from the first user to a second user;
requesting, by a second user device associated with the second user, the subset of the plurality of pieces of the data item from a corresponding subset of the group of vault devices;
generating, by the second user device, the data item using the subset of the plurality of pieces of the data item; and
using the generated data item to access the secure content by the second user device.

18. The non-transitory computer-readable medium of claim 17, wherein indications that each piece of the plurality of pieces of the data item has been stored by the vault devices in the group of vault devices are stored in a blockchain.

19. The non-transitory computer-readable medium of claim 18, wherein the blockchain is updated in response to the second user device retrieving the subset of the plurality of pieces of the data item.

20. The non-transitory computer-readable medium of claim 19, wherein the method further comprises receiving, by the first user device, an indication that the second user device has retrieved the subset of the plurality of pieces of the data item from the corresponding subset of the group of vault devices.

21. The non-transitory computer-readable medium of claim 17, wherein generating the plurality of pieces of the data item comprises converting the data item into a bitstream comprised of a plurality of bits, wherein each bit in the plurality of bits is assigned to one piece of the plurality of pieces of the data item based on a position of the bit in the plurality of bits.

22. The non-transitory computer-readable medium of claim 21, wherein converting the data item into the bitstream comprises converting the data item into the bitstream using a predetermined numerical base, and wherein the count N of the plurality of pieces is one more than the predetermined numerical base, and wherein the predetermined numerical base is greater than two.

23. The non-transitory computer-readable medium of claim 22, wherein a first piece of the plurality of pieces of the data item corresponds to an indication of a parity of remaining pieces of the plurality of pieces of the data item.

24. The non-transitory computer-readable medium of claim 17, wherein generating the plurality of pieces of the data item comprises:
dividing the data item into a series of 4-bit nibbles; and
for a first 4-bit nibble of the series of 4-bit nibbles, assigning each piece of the plurality of pieces of the data item a 4-bit nibble value that includes at least two of: a first two bits of the first 4-bit nibble, a second two bits of the first 4-bit nibble, a bit complement of the first two bits of the first 4-bit nibble, and a bit complement of the second two bits of the first 4-bit nibble, wherein each piece of the plurality of pieces of the data item is assigned a different 4-bit nibble value.

\* \* \* \* \*